US012651323B2

(12) United States Patent
    Kodama

(10) Patent No.: US 12,651,323 B2
(45) Date of Patent: Jun. 9, 2026

(54) INFORMATION PROCESSING APPARATUS, INFORMATION PROCESSING SYSTEM, AND INFORMATION PROCESSING METHOD

(71) Applicant: CANON KABUSHIKI KAISHA, Tokyo (JP)

(72) Inventor: Junichi Kodama, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 894 days.

(21) Appl. No.: 17/708,368

(22) Filed: Mar. 30, 2022

(65) Prior Publication Data

US 2022/0335592 A1     Oct. 20, 2022

(30) Foreign Application Priority Data

Apr. 19, 2021    (JP) ................................. 2021-070472

(51) Int. Cl.
    *G06T 7/00*         (2017.01)
    *G06T 1/60*         (2006.01)

(52) U.S. Cl.
    CPC .............. *G06T 7/0002* (2013.01); *G06T 1/60* (2013.01); *G06T 2207/20021* (2013.01); *G06T 2207/30184* (2013.01)

(58) Field of Classification Search
    CPC ..................... G06T 7/0002; G06T 1/60; G06T 2207/20021; G06T 2207/30184
    See application file for complete search history.

(56) References Cited

U.S. PATENT DOCUMENTS

| | | | | |
|---|---|---|---|---|
| 11,551,382 B2* | 1/2023 | Connelly | ................ | G06T 11/00 |
| 2013/0016108 A1* | 1/2013 | Isozu | ........................ | G06T 1/60 |
| | | | | 345/501 |
| 2022/0076411 A1* | 3/2022 | Georgescu | ............. | G06V 10/82 |
| 2023/0169517 A1* | 6/2023 | Garner, IV | ............. | G06Q 40/02 |
| | | | | 705/35 |
| 2024/0095387 A1* | 3/2024 | Fukada | ............... | G06F 21/6218 |

FOREIGN PATENT DOCUMENTS

| | | |
|---|---|---|
| JP | 2004-145759 A | 5/2004 |
| JP | 2019-057221 A | 4/2019 |
| WO | 2020/174863 A1 | 9/2020 |
| WO | 2020/243556 A1 | 12/2020 |

OTHER PUBLICATIONS

Notice of Reasons for Refusal issued by the Japanese Patent Office on Jan. 7, 2025 in corresponding JP Patent Application No. 2021-070472, with English translation.

* cited by examiner

*Primary Examiner* — Wesley J Tucker
(74) *Attorney, Agent, or Firm* — Carter, DeLuca & Farrell LLP

(57)     ABSTRACT

There is provided an information processing apparatus capable of efficient caching even in the case of image data in which a lot of pieces of partial image data are provided with metadata. The information processing apparatus has a specifying unit which specifies, from metadata of image data, partial metadata corresponding to partial image data obtained by dividing the image data into regions, a display unit which displays the partial metadata in association with the partial image data, and a cache unit which caches the partial image data based on a metadata characteristic specified as the partial metadata from among attributes described in the metadata.

12 Claims, 14 Drawing Sheets

| PARTIAL IMAGE FILE NAME | INPUT IMAGE FILE NAME | RESOLUTION LEVEL | TILE ID | CACHE PRIORITY | ACQUISITION DATE AND TIME |
|---|---|---|---|---|---|
| | 502 | 503 | 504 | 505 | 506 |
| 501 | | | | | |
| IMG001_1_1.jpg | IMG001.jpg | 1 | 1 | LOW | T001 |
| IMG001_4_27.jpg | IMG001.jpg | 4 | 27 | HIGH | T002 |
| IMG001_4_28.jpg | IMG001.jpg | 4 | 28 | HIGH | T003 |
| IMG002_3_10.jpg | IMG002.jpg | 3 | 10 | LOW | T004 |
| ⋮ | ⋮ | ⋮ | ⋮ | ⋮ | ⋮ |

| METADATA CHARACTERISTIC | IMPORTANCE |
|---|---|
| CRACK WIDTH 1.0 mm OR MORE | HIGH |
| CRACK WIDTH 0.5 mm - 1.0 mm | HIGH |
| CRACK WIDTH 0.2 mm - 0.5 mm | LOW |
| CRACK WIDTH 0.1 mm - 1.2 mm | LOW |
| ... | ... |

FIG.6A 601        603

| METADATA CHARACTERISTIC | DETAIL CHECKING RATE |
|---|---|
| CRACK WIDTH 1.0 mm OR MORE | 95% |
| CRACK WIDTH 0.5 mm - 1.0 mm | 82% |
| CRACK WIDTH 0.2 mm - 0.5 mm | 75% |
| CRACK WIDTH 0.1 mm - 1.2 mm | 30% |
| ... | ... |

FIG.6B

| FIG.7A |
|--------|
| FIG.7B |

INFORMATION PROCESSING APPARATUS, INFORMATION PROCESSING SYSTEM, AND INFORMATION PROCESSING METHOD

BACKGROUND

Field of the Disclosure

The present disclosure relates to an information processing apparatus, information processing system, and information processing method for caching divided partial image data.

Description of the Related Art

In an information processing apparatus which acquires image data from a server or the like and displays the image data, the acquired image data is generally cached. Caching the image data enables high-speed display. The cached image data is sequentially deleted if an upper limit of the cache size is reached. Cache data to be deleted is determined by, for example, a method of determining a target of deletion in order from oldest data.

It is also common practice to divide large image data into tiles (rectangular regions) of a plurality of resolutions and generate partial image data such that the information processing apparatus acquires the data in units of partial image data. For example, in the case of checking deformation data in an image of a structure or checking a landmark in a satellite image, the image of the structure or the satellite image is a single large piece of image data. The image data is divided into a plurality of pieces of partial image data. The information processing apparatus can provide high-speed display by acquiring only some of the pieces of partial image data corresponding to an image range and scaling rate of a display region. Methods of dividing image data into a plurality of pieces of partial image data and processing them includes JPEG2000, DeepZoom, and the like.

In the case of acquiring and displaying image data in units of partial image data, since the image data is acquired each time a user changes the image range or scaling rate of the display region, there may arise a problem that the cache does not function effectively. In order to solve the problem, for example, Japanese Patent Laid-Open No. 2004-145759 discloses a method of determining cache data to be deleted based on partial image data to be a display region and based on whether the partial image data is provided with metadata such that the cache of the partial image data functions effectively.

However, in a case where a lot of pieces of partial image data are provided with metadata, caching cannot be performed efficiently based on only the presence/absence of metadata. For example, in the case of checking deformation data in an image of a structure, there is a possibility that the entire image is provided with a deformation region. In this case, determining data to be cached based on only the presence/absence of metadata is inefficient because it results in caching the entire image. Also in the case of checking a landmark in a satellite image, there is a possibility that the landmark provided with metadata is given to the entire image, which inhibits efficient caching.

SUMMARY

The object of the present disclosure is to provide an information processing apparatus capable of efficient caching even in the case of image data in which a lot of pieces of partial image data are provided with metadata.

As a means to achieve the above object, an information processing apparatus includes: a specifying unit configured to specify, from metadata of image data, partial metadata corresponding to partial image data obtained by dividing the image data into regions, a display unit configured to display the partial metadata in association with the partial image data; and a cache unit configured to cache the partial image data based on a metadata characteristic specified as the partial metadata from among attributes described in the metadata.

Further features of the present invention will become apparent from the following description of exemplary embodiments with reference to the attached drawings.

BRIEF DESCRIPTION OF THE DRAWINGS

FIG. 5 is a diagram showing an example of information managed in a cache unit of the information processing apparatus;

FIGS. 6A and 6B are diagrams showing examples of information managed in an importance determination unit of the information processing apparatus;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

Although the following embodiments explain an example of application to an information processing apparatus for displaying deformation data as metadata in association with an image of a structure, this does not limit the use of the information processing apparatus according to the embodiments. The embodiments are also applicable to various uses such as an information processing apparatus for displaying landmark data or path information as metadata in association with a satellite image.

Furthermore, although the following embodiments explain an example of application to an information processing apparatus which uses DeepZoom as a method of dividing image data into a plurality of pieces of partial image data and processing them, this does not limit the method of dividing image data in the information processing apparatus according to the embodiments.

Moreover, the configurations shown in the following embodiments are merely exemplary and the present disclosure is not limited to the illustrated configurations.

First Embodiment

Figure 1:
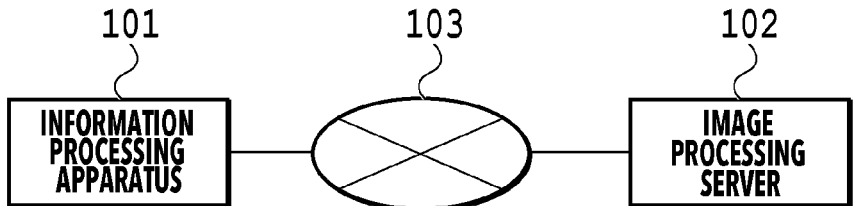
FIG. 1 is a block diagram showing a configuration example of an information processing system.

A configuration example of an information processing system according to the present embodiment will be described using the block diagram of FIG. 1.

The information processing system includes an information processing apparatus 101 and an image processing server 102. The information processing apparatus 101 and the image processing server 102 can communicate with each other through a network 103. The network 103 may be connected as an internal network such as a LAN, an external network such as the Internet, or a mixture thereof. Each of the information processing apparatus 101 and the image processing server 102 can be formed by a plurality of apparatus. Further, the information processing apparatus 101 and the image processing server 102 may be the same computer.

Figure 2:
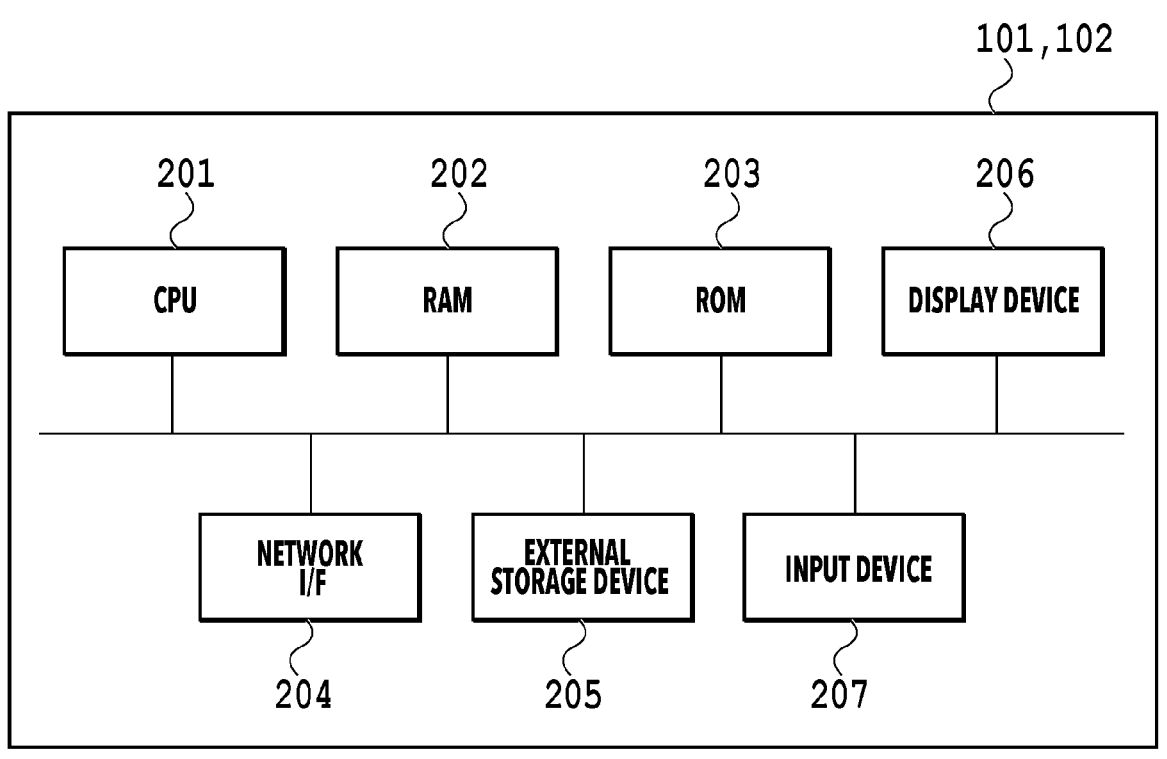
FIG. 2 is a block diagram showing a hardware configuration example of an information processing apparatus and an image processing server.

A hardware configuration example of the information processing apparatus 101 according to the present embodiment will be described using the block diagram of FIG. 2.

The information processing apparatus 101 comprises at least a CPU 201, a RAM 202, a ROM 203, a network interface 204, an external storage device 205, a display device 206, and an input device 207.

The CPU 201 performs operation control of each unit constituting the information processing apparatus 101 and also functions as a subject which executes various processes to be described later as ones to be performed by the information processing apparatus 101. The RAM 202 is a memory which temporarily stores data and control information and serves as a work area that the CPU 201 uses in execution of various processes.

The ROM 203 stores fixed operation parameters, operation programs, and the like of the information processing apparatus 101.

The network interface 204 provides functions to connect and communicate with the network 103. The network interface 204 enables the information processing apparatus 101 to transmit and receive data to and from an external apparatus.

The external storage device 205 is a device which stores data and has an interface which accepts an I/O command to read and write data. The external storage device 205 may be a hard disk drive (HDD), a solid state drive (SSD), an optical disk drive, a semiconductor storage device, or another storage device. The external storage device 205 stores a computer program and data for causing the CPU 201 to execute each process to be described later as one to be performed by the information processing apparatus 101.

The display device 206 is, for example, a liquid crystal display (LCD), and displays information necessary for a user.

The input device 207 is, for example, a keyboard, mouse, or touch panel, and accepts necessary input from a user.

Incidentally, a hardware configuration of the image processing server 102 according to the present embodiment is identical to the hardware configuration of the information processing apparatus 101.

Figure 3:
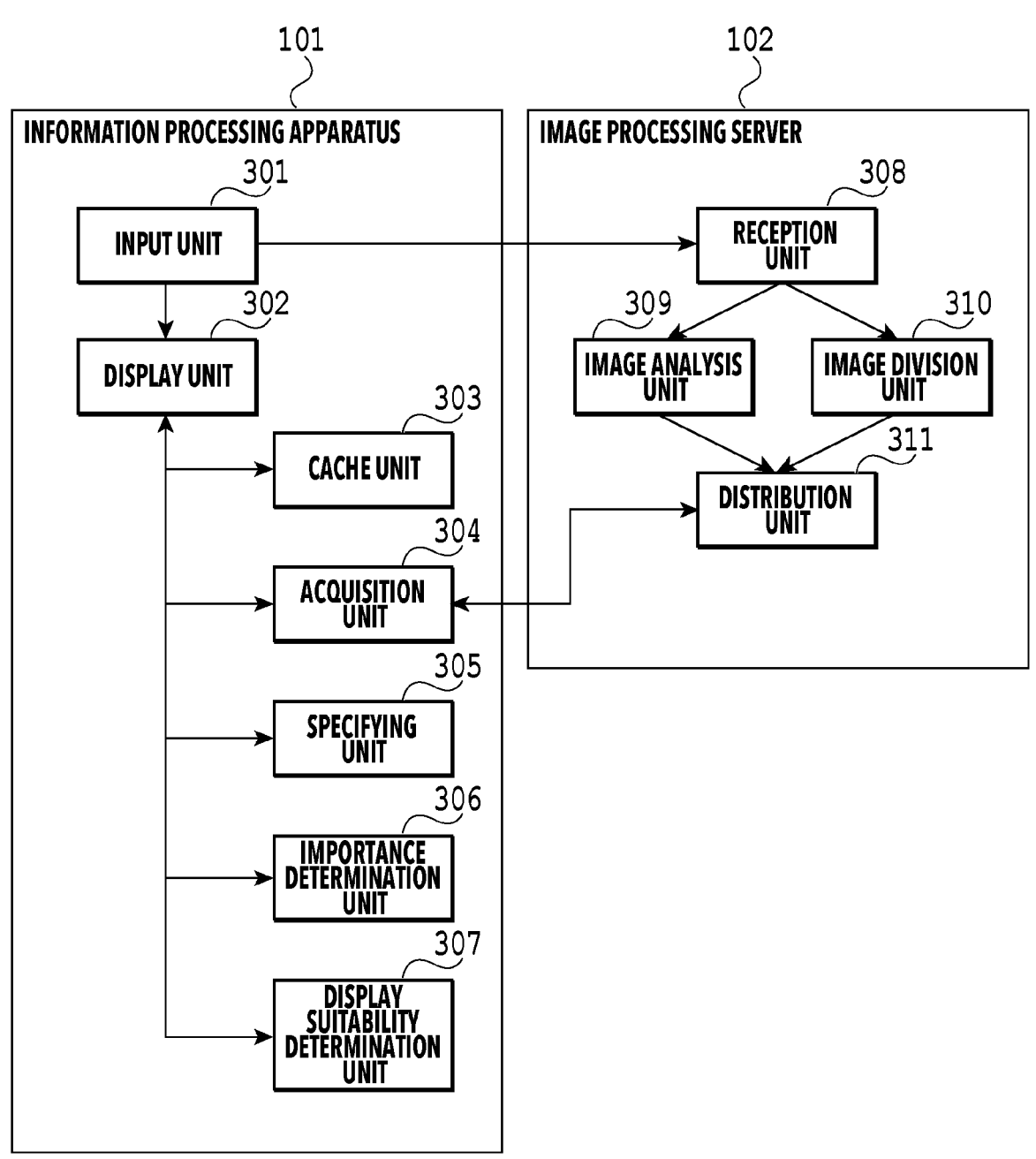
FIG. 3 is a block diagram showing a function configuration example of the information processing apparatus and the image processing server.

A function configuration example of the information processing apparatus 101 and the image processing server 102 according to the present embodiment will be described using the block diagram of FIG. 3.

The information processing apparatus 101 is an apparatus which acquires image data and metadata thereof from the image processing server 102 and displays the metadata in association with the image data. In terms of functions, the information processing apparatus 101 comprises an input unit 301, a display unit 302, a cache unit 303, an acquisition unit 304, a specifying unit 305, an importance determination unit 306, and a display suitability determination unit 307. The input unit 301 accepts input image data from a user and transmits the input image data to the image processing server 102. The display unit 302 accepts designation of a display region of image data from a user, associates partial metadata corresponding to partial image data specified by the specifying unit 305 with partial image data acquired by the acquisition unit 304, and displays the partial metadata and the partial image data on the display device 207. The acquisition unit 304 acquires, from the image processing server 102, metadata of input image data and partial image data corresponding to the display region designated in the display unit 302. As described above, the partial image data is obtained by dividing input image data into tiles of a plurality of resolutions. A data structure of the partial image data will be described later using FIG. 4.

The specifying unit 305 specifies partial image data corresponding to the display region designated by a user from the partial image data acquired by the acquisition unit 304 and also specifies partial metadata corresponding to the partial image data from the metadata similarly acquired by the acquisition unit 304. The importance determination unit 306 determines importance based on the partial metadata specified by the specifying unit 305. The display suitability determination unit 307 determines display suitability of the partial image data based on the display region designated by a user and a metadata region based on the partial metadata specified by the specifying unit 305. The cache unit 303 determines a cache priority of partial image data and caches the partial image data according to the importance determined by the importance determination unit 306 based on the partial metadata and the display suitability determined by the display suitability determination unit 307 for the metadata region. The cache priority is used to determine a target to be deleted in a case where the cache unit 303 deletes cache data.

The image processing server 102 is a server which analyzes input image data received from the information processing apparatus 101 and generates metadata. The image processing server 102 also divides the received input image data to generate partial image data. In terms of functions, the image processing server 102 comprises a reception unit 308, an image analysis unit 309, an image division unit 310, and a distribution unit 311. The reception unit 308 receives input image data from the information processing apparatus 101. The image analysis unit 309 analyzes the input image data received by the reception unit 308 to generate metadata. The image division unit 310 divides the input image data received by the reception unit 308 into a plurality of tiles to generate partial image data. The distribution unit 311 distributes the metadata generated by the image analysis unit 309 and the partial image data generated by the image division unit 310 to the information processing apparatus 101.

Figure 4:
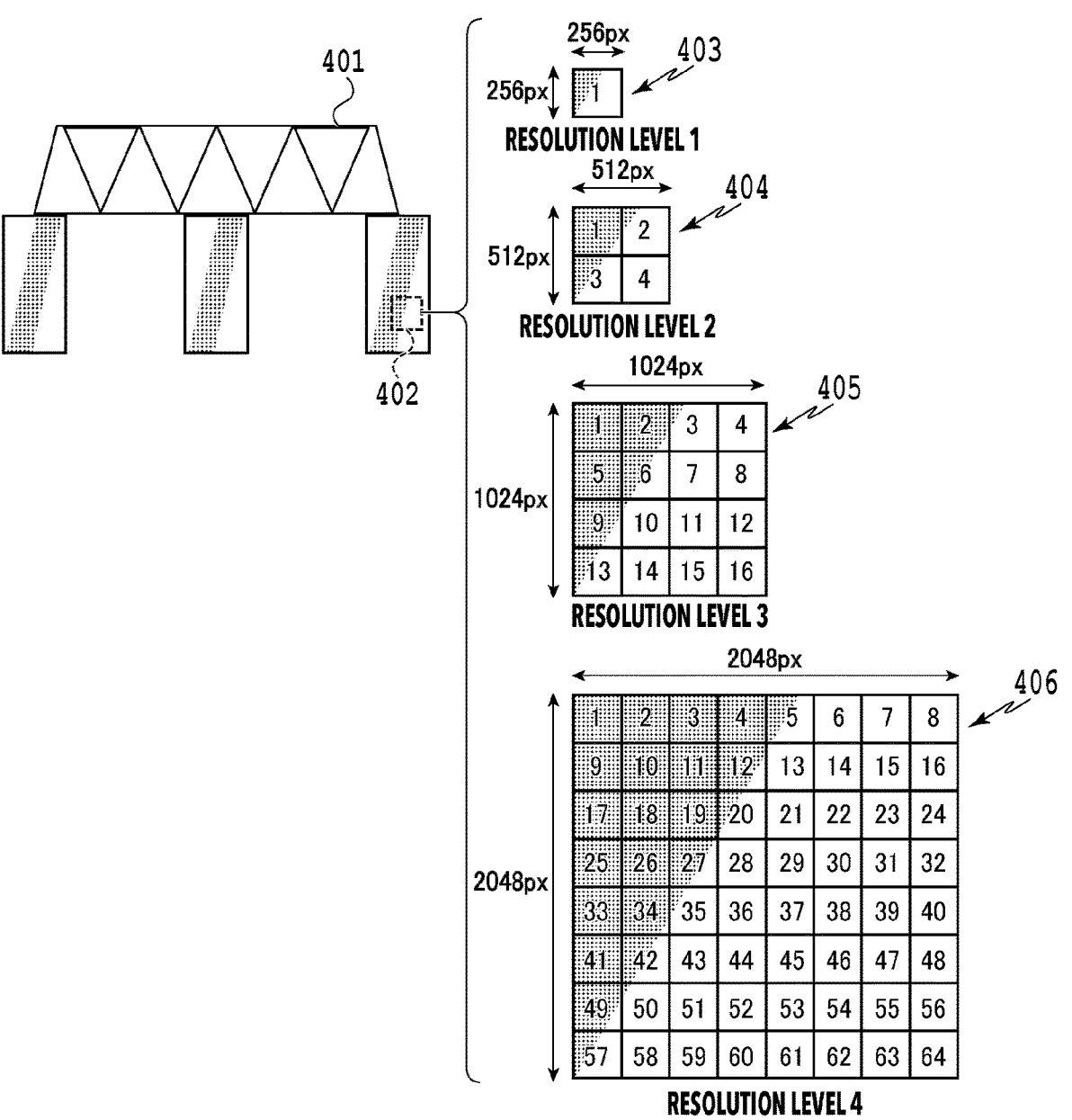
FIG. 4 is a diagram showing an example of a data structure of partial image data.

FIG. 4 is an example of a data structure of partial image data generated by the image processing server 102 and acquired, displayed, and cached in the information processing apparatus 101. The example shows an input image 402 obtained by capturing a part of a bridge pier of a structure 401 which is a bridge. In the example shown here, partial image data is generated by dividing the input image 402 obtained by capturing the structure 401 into tiles at a plurality of resolution levels 1 to 4 (403 to 406). 256×256 pixels (px) are defined as one tile and the image is divided into one tile at the resolution level 1 (403), four tiles at the resolution level 2 (404), 16 tiles at the resolution level 3 (405), and 64 tiles at the resolution level 4 (406). As a result, the total image sizes at the respective resolution levels are as follows: 256×256 pixels at the resolution level 1 (403), 512×512 pixels at the resolution level 2 (404), 1024×1024 pixels at the resolution level 3 (405), and 2048×2048 pixels at the resolution level 4 (406). Although the example shows that the division is made in such a manner that the number of pixels per tile is fixed and the number of tiles differs according to the resolution level, the division may be made in such a manner that the number of tiles is fixed and the number of pixels per tile differs according to the resolution level.

FIG. 5 is an example of cache data managed in the cache unit 303 of the information processing apparatus 101. An input image file name 502, a resolution level 503, a tile ID 504, a cache priority 505, and an acquisition date and time 506 are stored in association with a partial image file name 501. The partial image file name 501 is a file name which uniquely identifies partial image data. The input image file name 502 is a file name of an input image from which the partial image data is originated. The resolution level 503 is the resolution level described above with reference to FIG. 4 and the tile ID 504 is a tile number at that resolution level. The cache priority 505 is a priority used to determine a target to be deleted in the case of deleting cache data. Although there are two types of priority "high" and "low" in the example shown here, the priority may be defined in another form such as numerical values. The acquisition date and time 506 is a date and time of acquisition and caching of the partial image data.

FIG. 6A is an example of importance data managed in the importance determination unit 306. In a partial image data caching process to be described later, the cache priority is determined based on the importance data. The importance determination unit 306 prestores the importance data which specifies importance 602 in association with a metadata characteristic 601. The metadata characteristic 601 is a numerical value or conditional expression to use an arbitrary attribute described in the metadata to determine the importance. The present embodiment shows an example in which the metadata is deformation data associated with the image of the structure, and a crack, which is a deformation characteristic included in the deformation data, is treated. As a specific example, as to a crack in the concrete bridge pier, which is a deformation characteristic, a plurality of conditional expressions are defined using a crack width as an attribute. The importance of the metadata is defined according to the crack width treated as the metadata characteristic. Although there are two types of importance "high" and "low" in the example shown here, the priority may be defined in another form such as numerical values. The treated metadata is not limited to the deformation data and may be other data such as landmark data or path information associated with a satellite image.

Next, the operation of the information processing apparatus 101 and the image processing server 102 according to the present embodiment will be described.

Figures 7, 7A:
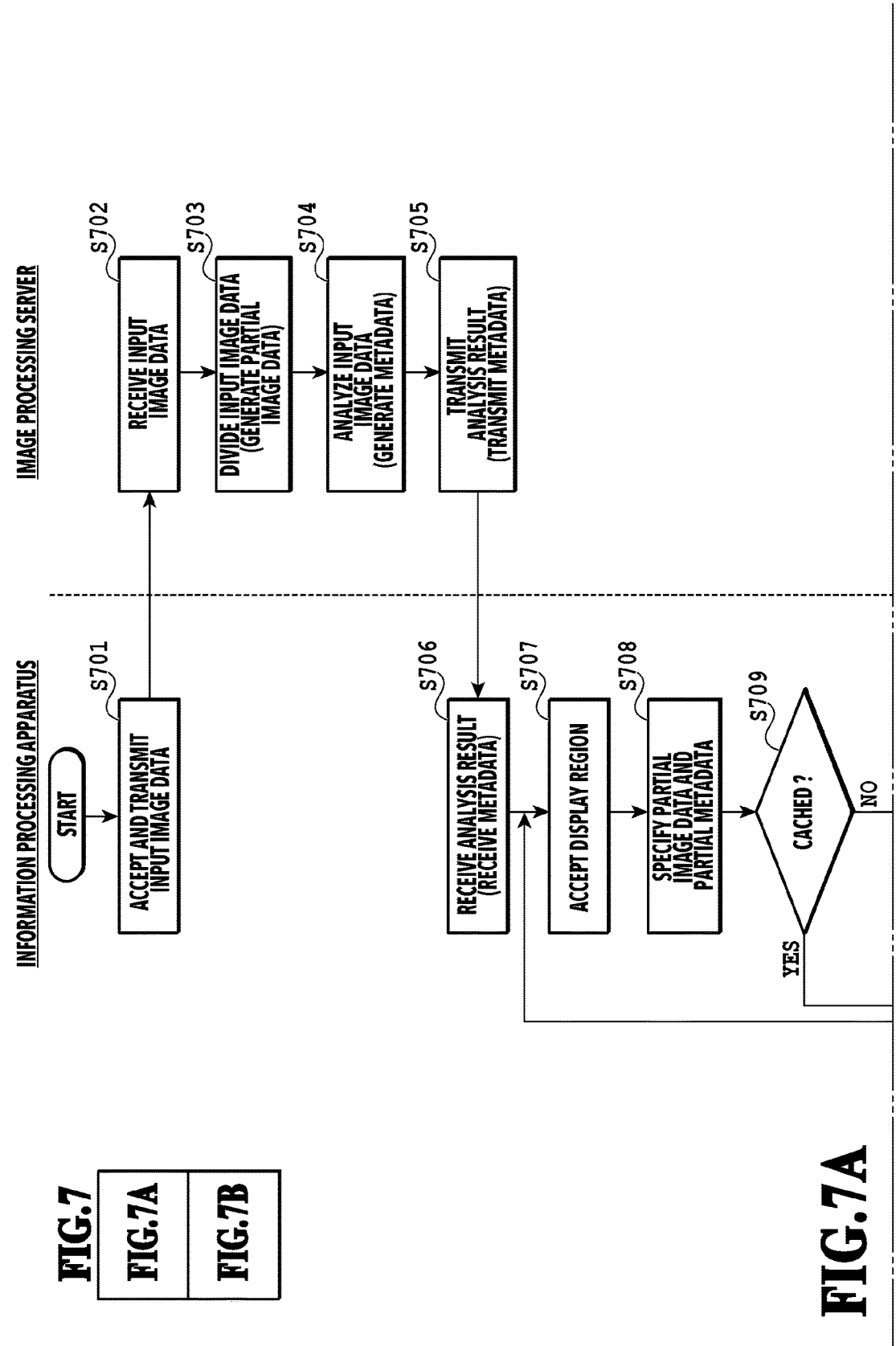
FIG. 7 is a diagram showing the relationship of FIGS. 7A and 7B.
FIGS. 7A and 7B are flowcharts showing operation of the image processing system.
Figure 7B:
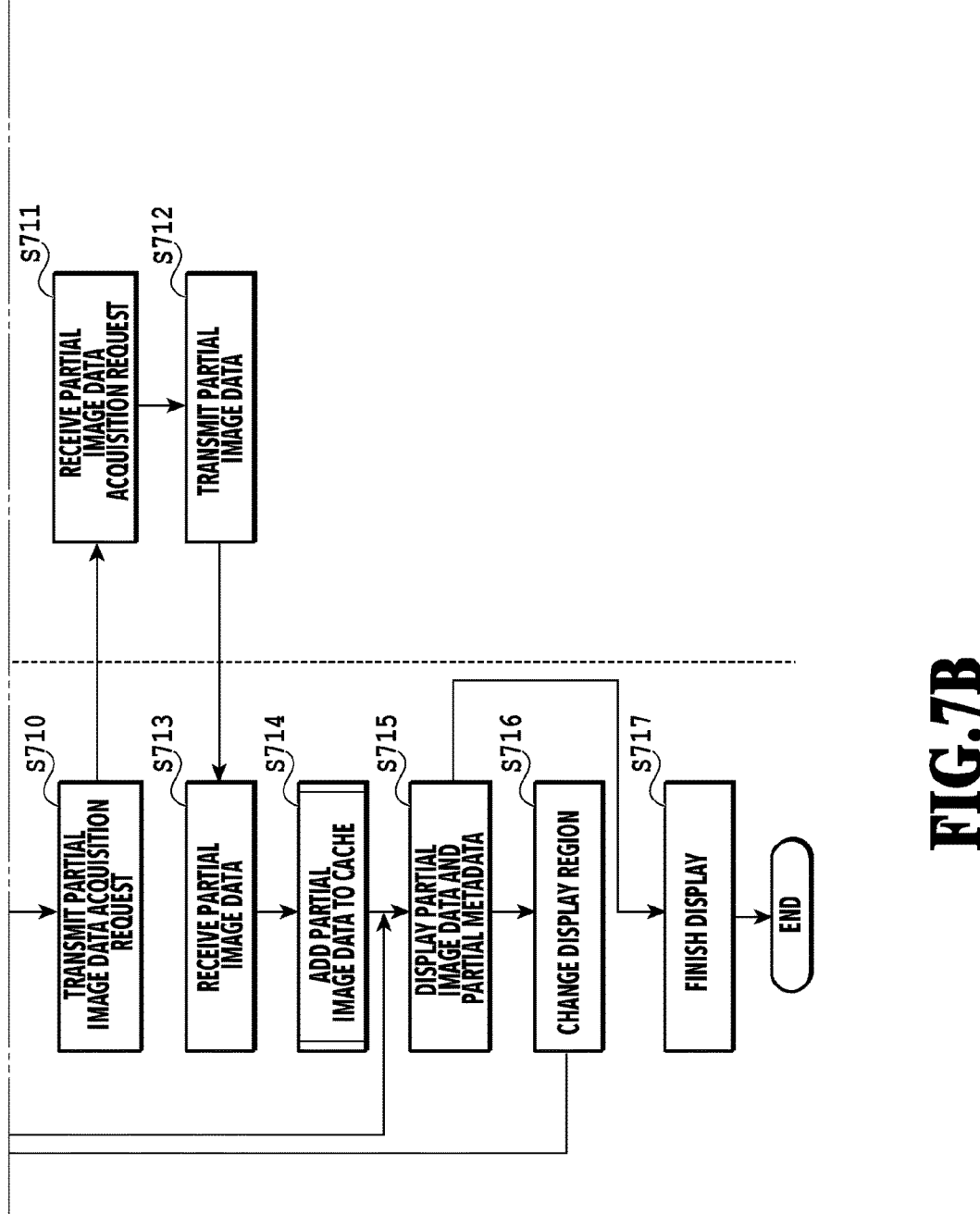

FIG. 7 is a flowchart showing the operation of the information processing apparatus 101 and the image processing server 102 according to the present embodiment. First, if a user inputs input image data to the input unit 301 of the information processing apparatus 101, the input image data is transmitted to the image processing server 102 (step S701). At this time, an instruction to treat crack data, which is a kind of deformation data, as metadata is input together with the input image data. The transmitted input image data is received by the reception unit 308 of the image processing server 102 (step S702). The received input image data is divided into tiles of a plurality of resolutions by the image division unit 310 to generate partial image data (step S703). The input image data is also subjected to image analysis by the image analysis unit 309 to generate metadata designated by a user instruction (step S704). The metadata generated by the image analysis unit 309 is distributed to the information processing apparatus 101 by the distribution unit 311 (step S705). The distributed metadata is received by the acquisition unit 304 of the information processing apparatus 101 (step S706).

Figure 8:
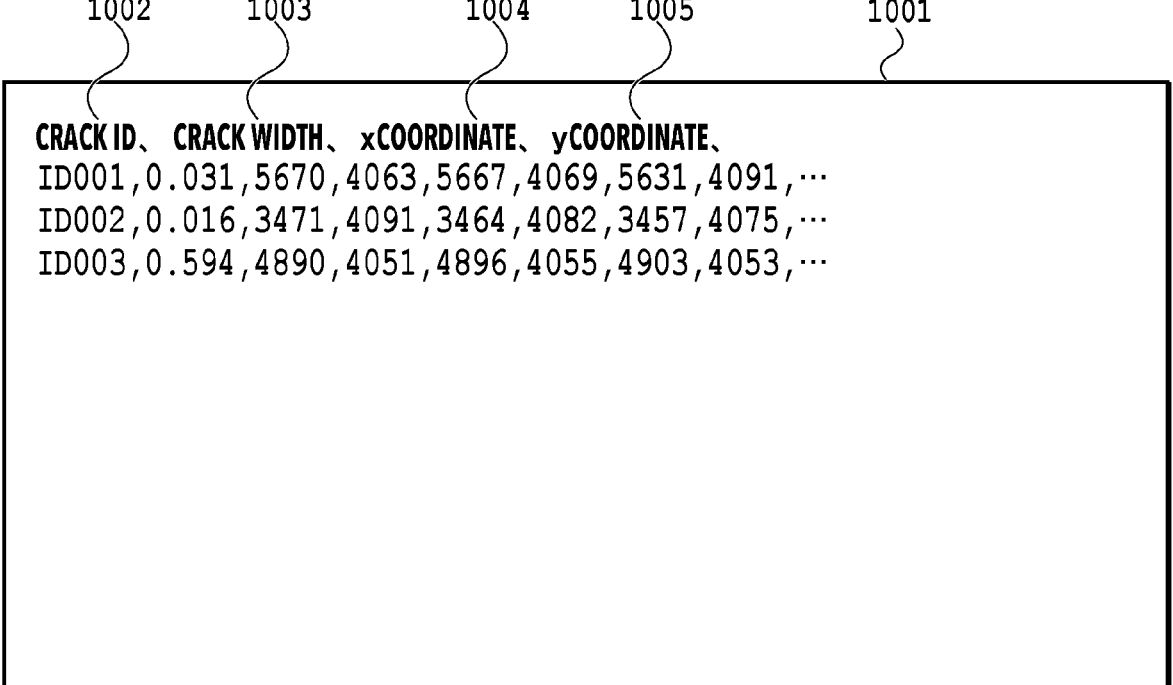
FIG. 8 is an example of metadata.

FIG. 8 is an example of the metadata. In the example shown here, crack data, which is a kind of deformation data on the structure, is treated as the metadata as explained above. The image analysis unit 309 uses a known image processing technique to detect cracks in the concrete bridge pier from the input image data and generate crack data for each of the locations of the detected cracks. A metadata file 1001 in CSV form describes a crack width 1003, which is an attribute treated as the metadata characteristic, in association with a crack ID 1002, which uniquely identifies the crack data. As the crack data, the metadata file 1001 also describes x-coordinates 1004 and y-coordinates 1005 of points constituting a polyline of the crack. The x-coordinates 1004 and y-coordinates 1005 are values indicating coordinates in the input image data and are, for example, coordinates with reference to an origin point at the lower left corner of the input image 402 shown in FIG. 4. The x-coordinates 1004 and y-coordinates 1005 are described by the number of points constituting the polyline.

The same also applies to the case of treating other metadata such as landmark data or path information associated with a satellite image. In this manner, as to an arbitrary attribute described in the metadata, values indicating coordinates in the input image and metadata characteristics used to determine the importance as will be explained later are described. Incidentally, although the partial image data and the metadata are separate files in the example shown here, the metadata may be passed as part of image data such as Exif data.

Returning to FIG. 7, if the metadata is received in the acquisition unit 304 of the information processing apparatus 101, the display unit 302 accepts designation of a display region of the input image data from a user via the input unit 301 (step S707). In the designation of a display region, a user designates a range and scaling rate of a display region to be displayed. For example, x- and y-coordinates of an origin point of a rectangular region and the number of vertical and horizontal pixels may be input, or a rectangular region may be designated by a cursor on the display device 207. If the designation of a display region is accepted, the specifying unit 305 specifies partial image data corresponding to the display region (step S708). Further, with reference to the specified partial image data and the metadata defined in the metadata file 1001 shown in FIG. 8, a crack ID including coordinate values of a crack within the range of coordinates of the partial image data is extracted. The extracted crack ID is specified as partial metadata and associated with the partial image data (step S708). The partial metadata is not limited to an identifier (ID) and may be any information as long as it can specify an attribute to be treated as the metadata characteristic from among arbitrary attributes described in the metadata.

If the partial image data is specified, the display unit 302 checks whether the partial image data is cached by the cache unit 303 (step S709). If the partial image data is cached, the display unit 302 displays the partial metadata in association with the partial image data (step S715). That is, the display unit 302 refers to the metadata file 1001 shown in FIG. 8 using the crack ID of the partial metadata associated with the partial image data, acquires coordinate values as crack data, and displays the partial image data including the crack.

If the partial image data is not cached, the acquisition unit 304 transmits a partial image data acquisition request to the image processing server 102 (step S710). The transmitted partial image data acquisition request is received by the distribution unit 311 of the image processing server 102 (step S711). The distribution unit 311 transmits partial image data corresponding to the acquisition request to the information processing apparatus 101 (step S712). The acquisition request includes the display region and scaling rate designated by a user and all tiles of the designated display region are transmitted. The transmitted partial image data is received by the acquisition unit 304 of the information processing apparatus 101 (step S713). The display unit 302 stores the received partial image data in the cache unit 303 and performs cache addition (step S714). The cache addition process will be described later with reference to FIG. 9. The display unit 302 then displays the partial metadata in association with the partial image data (step S715). After that, if a user changes the image range or scaling rate of the display region (step S716), the process returns to step S707. If a user selects the end of the display (step S717), the process is finished.

Figure 9:
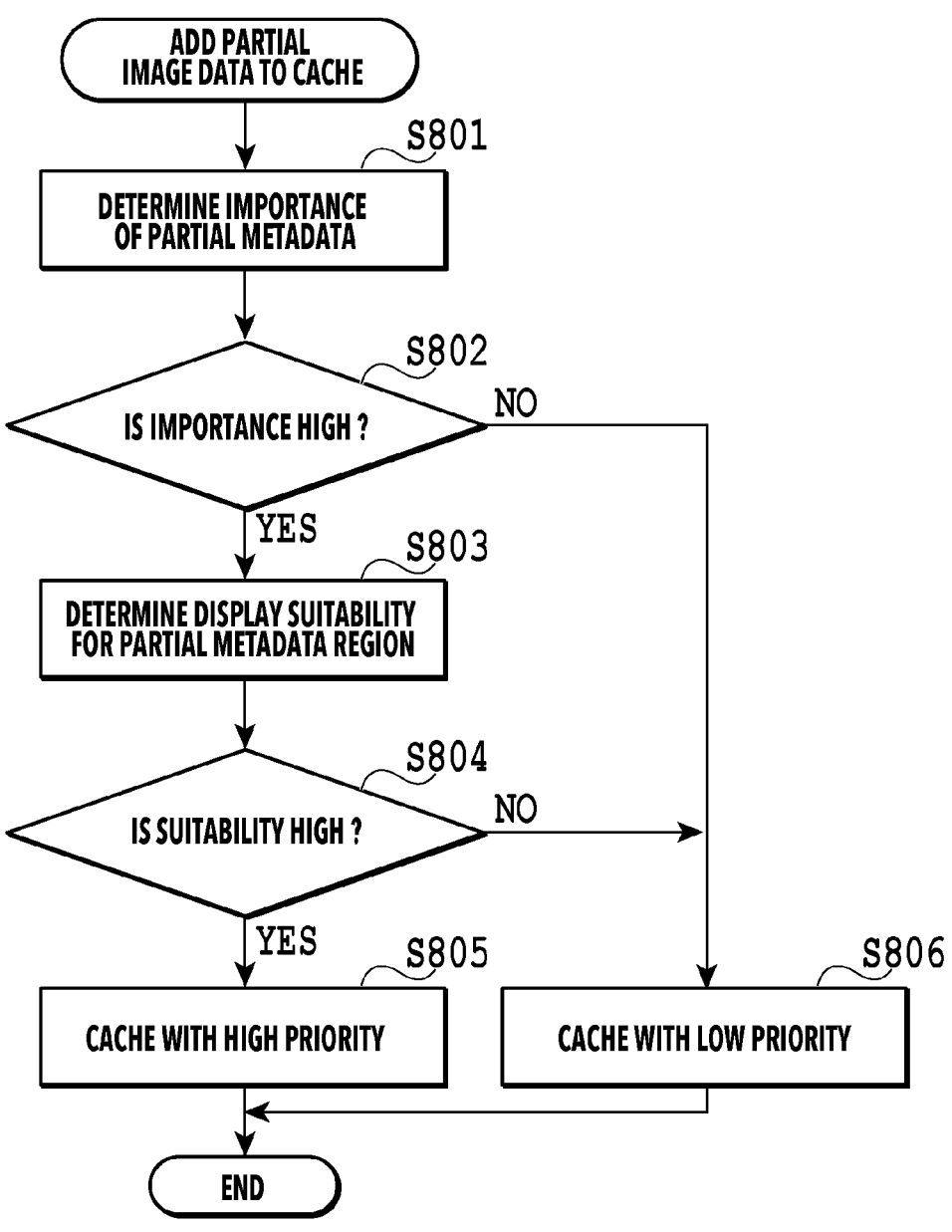
FIG. 9 is a flowchart showing a cache addition process.

FIG. 9 is a flowchart showing the partial image data cache addition process performed by the information processing apparatus 101.

First, the importance determination unit 306 determines importance of partial metadata (step S801). Referring to the metadata using partial metadata corresponding to the partial image data, the importance is determined by the importance data managed in the importance determination unit 306 based on an attribute treated as the metadata characteristic out of attributes described in the metadata. More specifically, the metadata file 1001 shown in FIG. 8 is referred to using the crack ID included in the partial metadata and a crack width treated as the metadata characteristic is specified. Next, the importance data shown in FIG. 6 is referred to and the importance 602 is determined according to the crack width described in the metadata characteristic 601.

The cache unit 303 checks whether the determined importance is "high" (step S802) and if it is not "high," caches the data with the cache priority "low" (step S806). If the importance is "high," the display suitability determination unit 307 determines display suitability of the partial image data for the partial metadata region (step S803). The method of determining the display suitability will be described later in detail with reference to FIG. 10. The cache unit 303 checks whether the display suitability is "high" (step S804)

and if it is not "high," caches the data with the cache priority "low" (step S806). If the display suitability is "high," the cache unit 303 caches the data with the cache priority "high" (step S805). Incidentally, although each of the importance of the partial metadata, the display suitability, and the cache priority is expressed by two values "high" and "low" in the example shown here, they may be defined in another form such as numerical values.

Figure 10B:
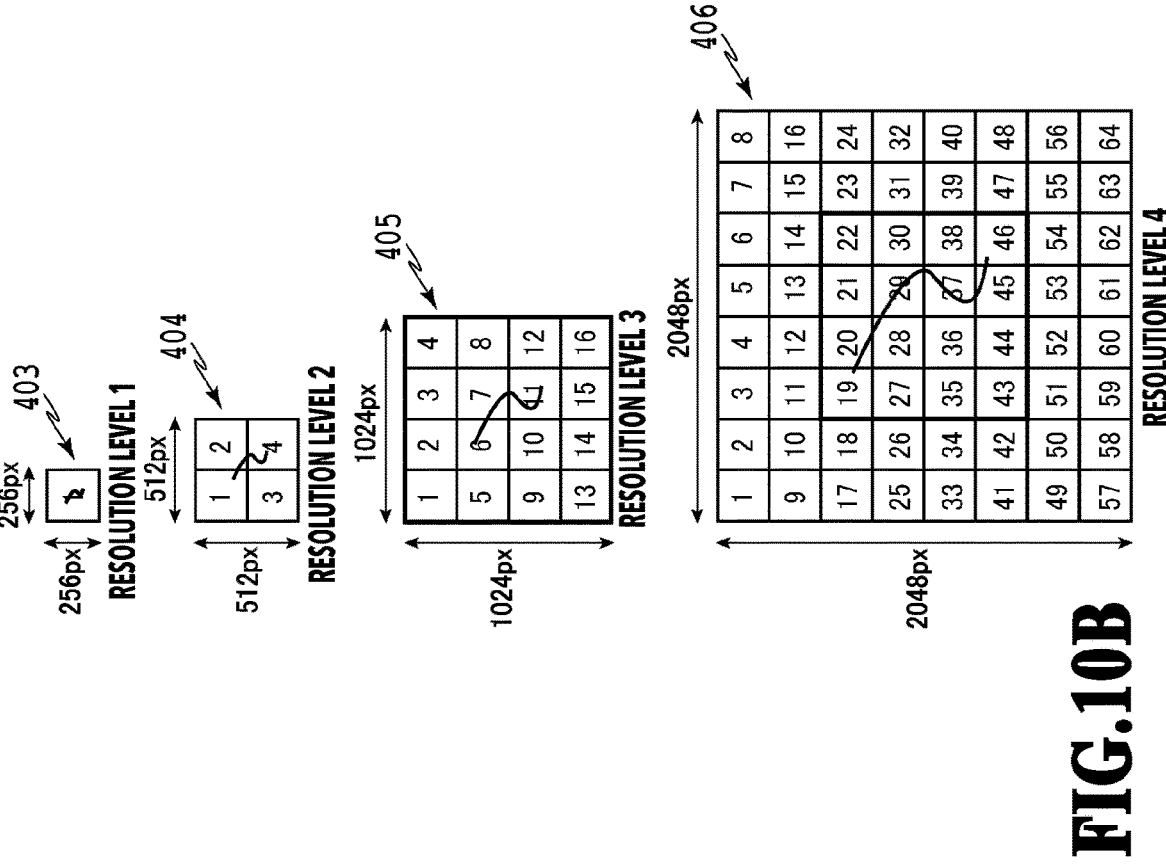
FIGS. 10A and 10B are diagrams showing examples of a relationship between a display region and a deformation region.
Figure 10A:
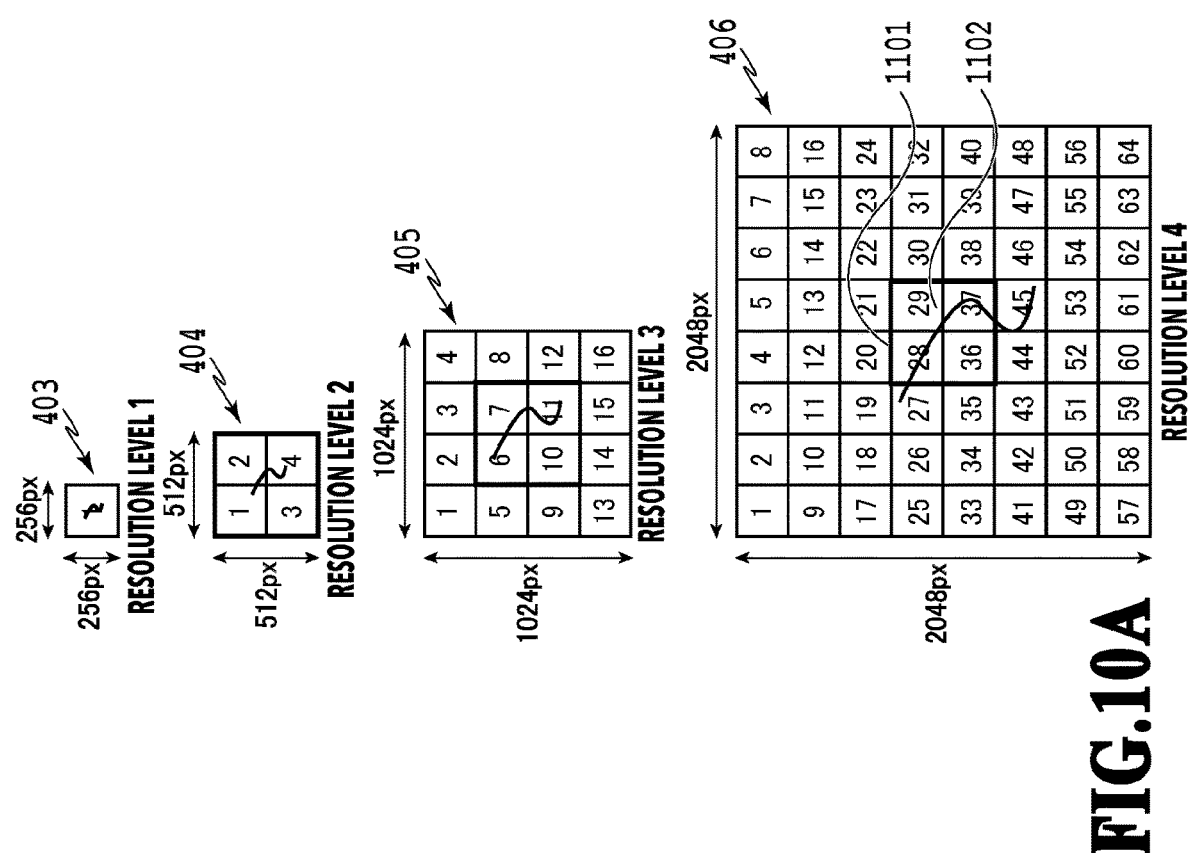

FIGS. 10A and 10B show examples of the relationship between the display region and the metadata region. In the examples shown here, crack data, which is a kind of deformation data associated with the image of the structure, is treated as the metadata. The treated metadata may be other data such as landmark data or path information associated with a satellite image.

A display region 1101 designated by a user is indicated by a thick line region for each of the resolution levels shown in FIG. 4. A curve at the center of the image region indicates a crack in the bridge pier and indicates a crack 1102 defined by the metadata shown in FIG. 8. Here, a crack determined to have the importance "high" is displayed. As to the metadata characteristic specified in the partial metadata, a rectangular region including coordinates defined by the metadata is defined as a metadata region. In this example, the metadata region has about 75×75 pixels in the image of the resolution level 1 (403), about 150×150 pixels in the image of the resolution level 2 (404), about 300×300 pixels in the image of the resolution level 3 (405), and about 600×600 pixels in the image of the resolution level 4 (406).

FIG. 10A shows the relationship between the display region and the metadata region in a case where the display region (thick line region) designated by a user has 512×512 pixels. The display suitability determination unit 307 determines that the display suitability is highest at the resolution level 3, which is the highest resolution among the resolution levels capable of including the entire metadata region in the display region. Accordingly, in the partial image data of the resolution level 3 (405), tiles 6, 7, 10, and 11 to be the metadata region are determined to have a high cache priority. Incidentally, the cache priority of tiles 1 to 4, 5, 8, 9, 12, and 13 to 16 may also be increased as a peripheral region of the metadata region.

FIG. 10B shows the relationship between the display region and the metadata region in a case where the display region designated by a user has 1024×1024 pixels. The display suitability determination unit 307 determines that the display suitability is highest at the resolution level 4, which is the highest resolution among the resolution levels capable of including the entire metadata region in the display region. Accordingly, in the partial image data of the resolution level 4 (406), tiles 19 to 22, 27 to 30, 35 to 38, and 43 to 46 to be the metadata region are determined to have a high cache priority. Incidentally, the cache priority of tiles 10 to 15, 18, 23, 26, 31, 34, 39, 42, 47, and 50 to 55 may also be increased as a peripheral region of the metadata region. Alternatively, only tiles 19, 20, 28, 29, 37, 45, and 46 associated with the partial metadata may be determined to have a high priority.

In the case of treating the crack data as the metadata, the crack width may be used to determine the display suitability. For example, it is assumed that the crack width is one pixel in the image of the resolution level 1, two pixels in the image of the resolution level 2, four pixels in the image of the resolution level 3, and eight pixels in the image of the resolution level 4. In a case where the display suitability of the crack width indicates 10 pixels, the resolution level 4 is determined to have the highest display suitability irrespective of the size of the display region. Accordingly, in a case where the display region has 512×512 pixels, in the partial image data of the resolution level 4 (406) of FIG. 10A, tiles 19 to 22, 27 to 30, 35 to 38, and 43 to 46 to be the metadata region are determined to have a high cache priority. Similarly, in a case where the display region has 1024/1024 pixels, in the partial image data of the resolution level 4 of FIG. 10B, tiles 19 to 22, 27 to 30, 35 to 38, and 43 to 46 to be the metadata region are determined to have a high cache priority.

Figure 11:
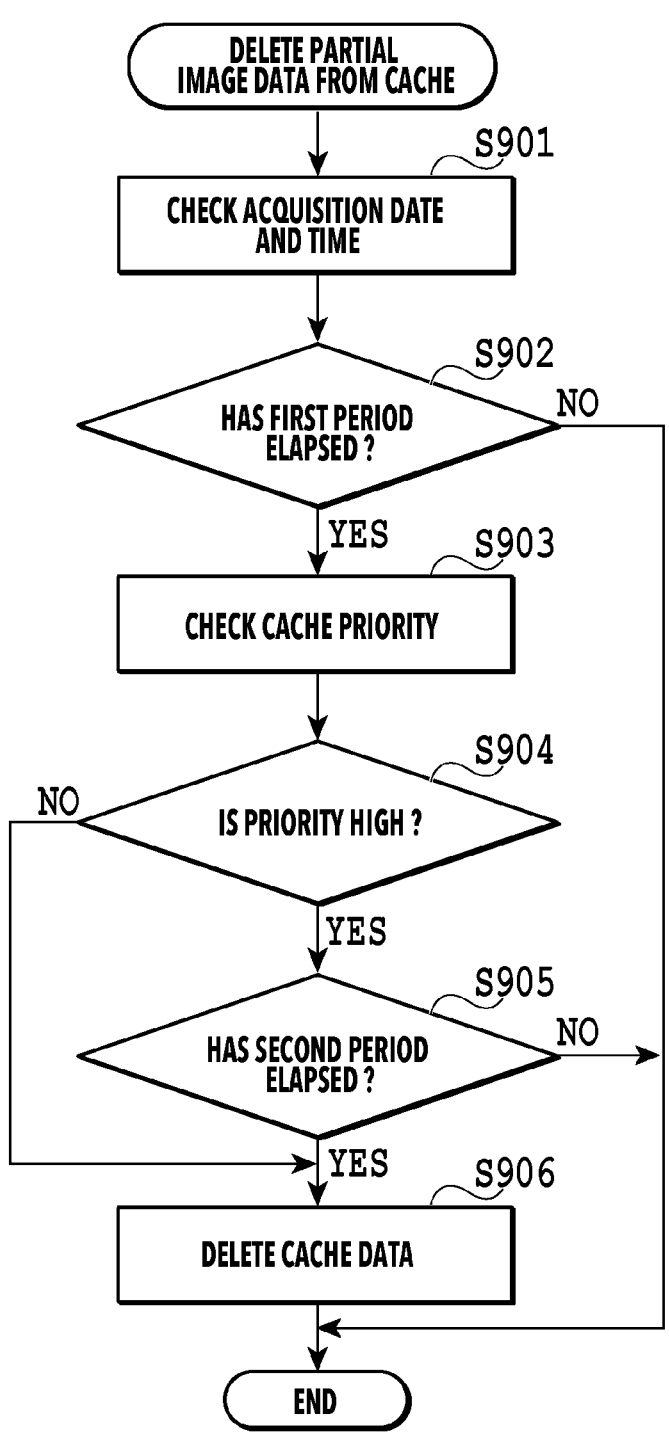
FIG. 11 is a flowchart showing a cache deletion process.

FIG. 11 is a flowchart showing the partial image data cache deletion process performed by the information processing apparatus 101. The cache deletion process may be executed depending on the remaining amount of the cache at the time of cache addition in step S714 of FIG. 7 or may be executed by regular batch processing.

First, the cache unit 303 checks the acquisition date and time 506 of the cache data (step S901). The cache unit 303 determines whether a first period has elapsed based on the acquisition date and time of the cache data (step S902) and if the first period has not elapsed, finishes the process. If the first period has elapsed, the cache unit 303 checks the cache priority 505 (step S903). If the cache priority is not "high," the cache unit 303 deletes the cache data (step S906). If the cache priority is "high," the cache unit 303 determines whether a second period has elapsed from the acquisition date and time (step S905) and if the second period has not elapsed, finishes the process. If the second period has elapsed, the cache unit 303 deletes the cache data (step S906).

Figure 12:
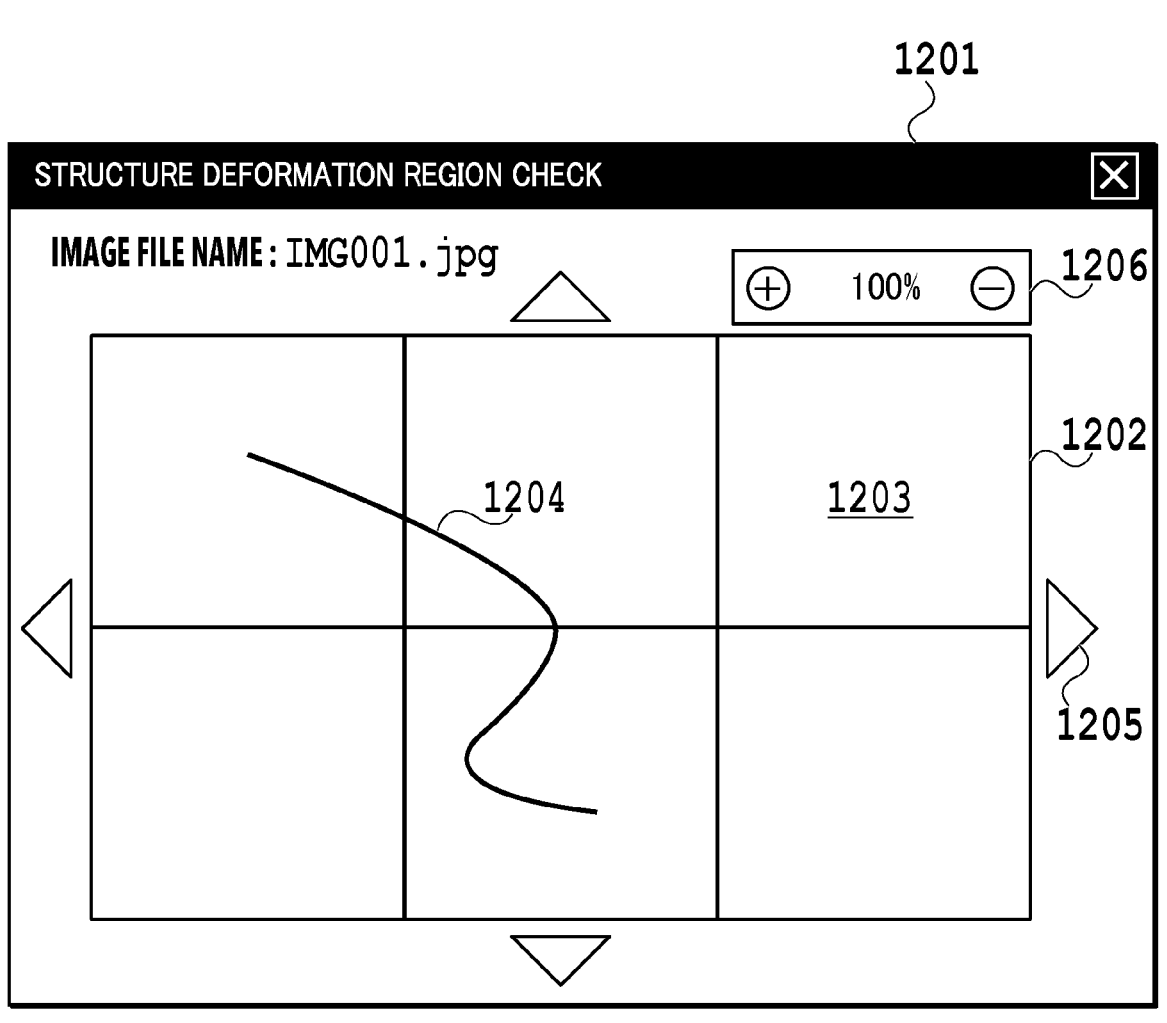
FIG. 12 is a diagram showing an example of a screen of a display unit of the information processing apparatus.

FIG. 12 is an example of a screen displayed by the display unit 302 of the information processing apparatus 101. In the example shown here, crack data, which is a kind of deformation data on the structure, is treated as the metadata.

A screen 1201 includes a display region 1202 and displays a crack 1204 specified by referring to the metadata using the crack ID included in the partial metadata in association with partial image data 1203 corresponding to the display region. The screen 1201 also includes move buttons 1205 of the display region to change the displayed image region and a scaling button 1206 of the display region to change the scaling rate of the displayed image.

As described above, according to the information processing apparatus of the present embodiment, the partial image data is cached based on the importance of the metadata and the display suitability for the metadata region. Therefore, caching can be performed efficiently even in the case of image data in which a lot of pieces of partial image data are provided with metadata.

Second Embodiment

The first embodiment has shown the example in which the information processing apparatus 101 determines the importance of metadata based on the correspondence table between the metadata characteristic and the importance. The present embodiment shows an example in which the importance of metadata is determined based on a usage trend of partial image data by a user.

FIG. 6B is an example of importance data managed by the importance determination unit 306 of the information processing apparatus 101 according to the present embodiment. A detail checking rate 603 is prestored as the usage trend in association with the metadata characteristic 601. In the example shown here, crack data, which is a kind of deformation data on the structure, is treated as the metadata. The rate of a user's past checking is managed in association with the crack width treated as the metadata characteristic. In a case where the detail checking rate 603 is equal to or greater than a predetermined threshold, the importance determination unit 306 determines that the importance of metadata having that metadata characteristic is "high."

As described above, according to the information processing apparatus of the present embodiment, the importance of metadata is determined based on the usage trend by a user. Therefore, caching can be performed efficiently in consideration of the usage trend by a user.

Third Embodiment

The first embodiment has shown the example in which the information processing apparatus 101 acquires and displays partial image data corresponding to a display region designated by a user. The present embodiment shows an example in which cached partial image data is displayed with a high priority.

Figure 13:
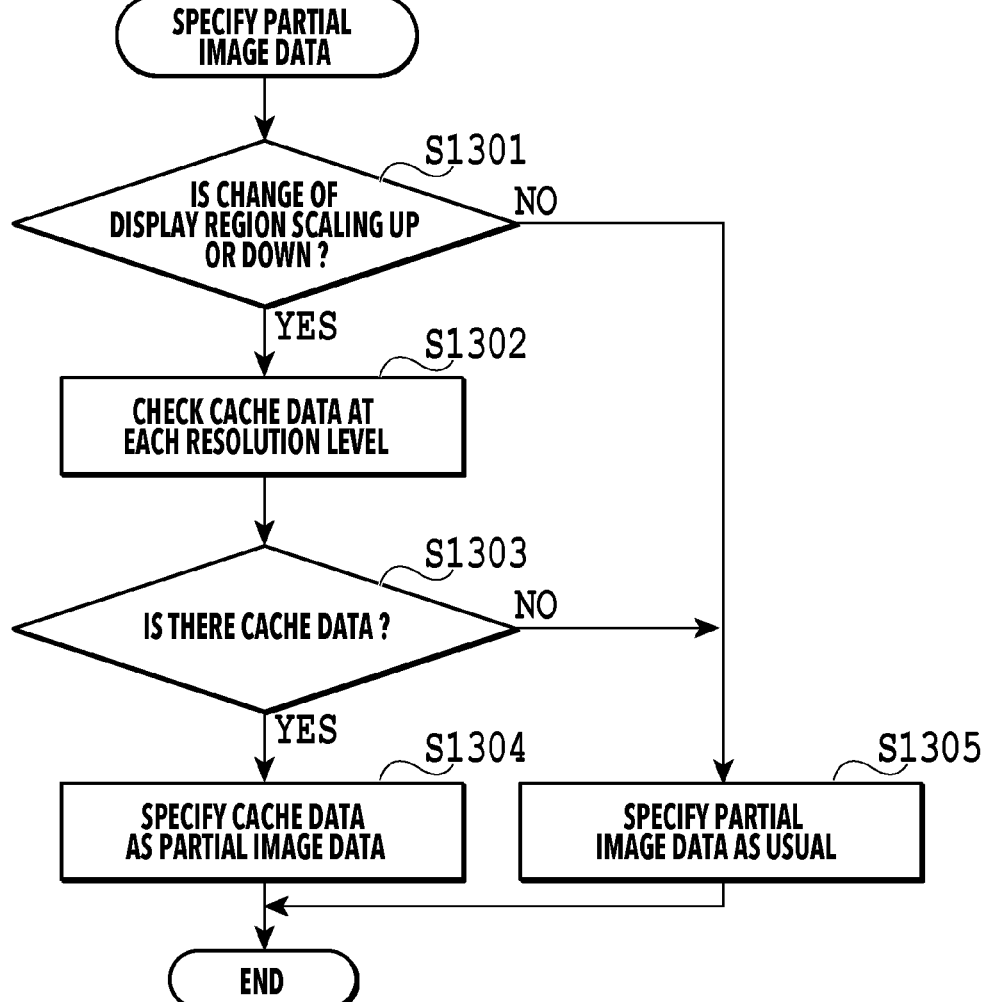
FIG. 13 is a flowchart showing a partial image data specifying process.

FIG. 13 is a flowchart showing a process of specifying partial image data to be displayed, which is performed by the information processing apparatus 101. In step S707 of FIG. 7, the display unit 302 determines whether the change of the display region is made by scaling up or down (step S1301). If the change is not made by scaling up or down, partial image data is specified as usual (step S1305). If the change is made by scaling up or down, it is checked whether partial image data of each resolution level for scaling up or down is cached by the specifying unit 305 in step S708 of FIG. 7 (step S1302). If there is no cache data, partial image data is specified as usual (step S1305). If there is cache data, the cached partial image data is specified as partial image data corresponding to the display region (step S1304).

As described above, according to the information processing apparatus of the present embodiment, cached partial image data is displayed with a high priority at the time of scaling up or down the display region. Therefore, the cached partial image data can be efficiently utilized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure having the above configurations, the information processing apparatus caches partial image data based on the metadata characteristic for each piece of partial image data. Therefore, caching can be performed efficiently even in the case of image data in which a lot of pieces of partial image data are provided with metadata.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-070472, filed Apr. 19, 2021, which is hereby incorporated by reference wherein in its entirety.

What is claimed is:

1. An information processing apparatus displaying metadata in association with image data, comprising:

a processor; and a memory, including instructions stored thereon, which when executed by the processor cause the apparatus to:

specify, from metadata of image data, partial metadata corresponding to partial image data obtained by dividing the image data into regions;

display the partial metadata in association with the partial image data; and cache the partial image data based on a metadata characteristic specified as the partial metadata from among attributes described in the metadata, and wherein, in a case where a partial image data is specified as being displayed, if the specified partial image data is cached, the processor causes the display of the specified partial image data from the cache and displays the specified partial image data, and if the specified partial image data is not cached, the processor causes the apparatus to acquire the specified partial image data from an external server and display the specified partial image data, and wherein, in a case where a first period has elapsed since the specified partial image data is cached and a cache priority used to determine to be deleted the cached specified partial image data is not high, the processor deletes the cached specified partial image data, and wherein, in a case where in a case where a first period has elapsed since the specified partial image data is cached and a cache priority used to determine to be deleted the cached specified partial image data is high and a second period has elapsed since the specified partial image data is cached, the processor deletes the cached specified partial image data.

2. The information processing apparatus according to claim 1, wherein the processor further determines importance defined according to the metadata characteristic, and caches the partial image data based on the importance.

3. The information processing apparatus according to claim 2, wherein the processor prestores importance data in which importance is specified in association with the metadata characteristic and determines the importance based on the metadata characteristic specified as the partial metadata by the processor.

4. The information processing apparatus according to claim 2, wherein the processor prestores importance data in which a usage tend of the partial image data is specified in association with the metadata characteristic and determines the importance based on a usage tend of the partial image data corresponding to the partial metadata specified by the processor.

5. The information processing apparatus according to claim 2, wherein the processor further determines display suitability of the partial image data associated with the partial metadata in a display region, and caches the partial image data based on the importance and the display suitability.

6. The information processing apparatus according to claim 5, wherein the processor determines the display suitability based on a rectangular region including coordinates defined by the metadata as to the metadata characteristic specified by the partial metadata and a display region designated by a user.

7. The information processing apparatus according to claim 5, wherein the processor stores a cache priority together with the partial image data based on the importance and the display suitability and performs a deletion process based on the cache priority.

8. The information processing apparatus according to claim 1, wherein the metadata is deformation data on a structure included in the image data, and the metadata characteristic is a characteristic of deformation included in the deformation data.

9. The information processing apparatus according to claim 8, wherein the partial metadata includes an identifier specifying a characteristic of deformation included in the deformation data from among attributes described in the metadata.

10. The information processing apparatus according to claim 1, wherein the processor displays partial image data cached with a high priority.

11. An information processing method of displaying metadata in association with image data, the information processing method comprising:

a specifying step of specifying, from metadata of image data, partial metadata corresponding to partial image data obtained by dividing the image data into regions;

a display step of displaying the partial metadata in association with the partial image data; and a cache step of caching the partial image data based on a metadata characteristic specified as the partial metadata from among attributes described in the metadata, and wherein, in a case where a partial image data is specified as being displayed, if the specified partial image data is cached in the cache step, the display step acquires the specified partial image data from the cache and displays the specified partial image data, and if the specified partial image data is not cached in the cache step, the display step acquires the specified partial image data from an external server and displays the specified partial image data, and wherein, in a case where a first period has elapsed since the specified partial image data is cached and a cache priority used to determine to be deleted the cached specified partial image data is not high, the display step deletes the cached specified partial image data, and wherein, in a case where in a case where a first period has elapsed since the specified partial image data is cached and a cache priority used to determine to be deleted the cached specified partial image data is high and a second period has elapsed since the specified partial image data is cached, the display step deletes the cached specified partial image data.

12. A non-transitory computer-readable storage medium storing a program for causing a computer to perform an information processing method of displaying metadata in association with image data, the method comprising:

a specifying step of specifying, from metadata of image data, partial metadata corresponding to partial image data obtained by dividing the image data into regions; a display step of displaying the partial metadata in association with the partial image data; and a cache step of caching the partial image data based on a metadata characteristic specified as the partial metadata from among attributes described in the metadata, and wherein, in a case where a partial image data is specified as being displayed, if the specified partial image data is cached in the cache step, the display step acquires the specified partial image data from the cache and displays the specified partial image data, and if the specified partial image data is not cached in the cache step, the display step acquires the specified partial image data from an external server and displays the specified partial image data, and wherein, in a case where a first period has elapsed since the specified partial image data is cached and a cache priority used to determine to be deleted the cached specified partial image data is not high, the display step deletes the cached specified partial image data, and wherein, in a case where in a case where a first period has elapsed since the specified partial image data is cached and a cache priority used to determine to be deleted the cached specified partial image data is high and a second period has elapsed since the specified partial image data is cached, the display step deletes the cached specified partial image data.

\* \* \* \* \*